Oct. 6, 1970

J. B. PROCTOR ET AL 3,532,576

APPARATUS FOR MAKING GYPSUM BOARD

Filed June 20, 1966

INVENTORS
JOHN B. PROCTOR
LEO B. HAKES
WAYNE R. MERKLEY

BY Robert F. Hause

ATTORNEY

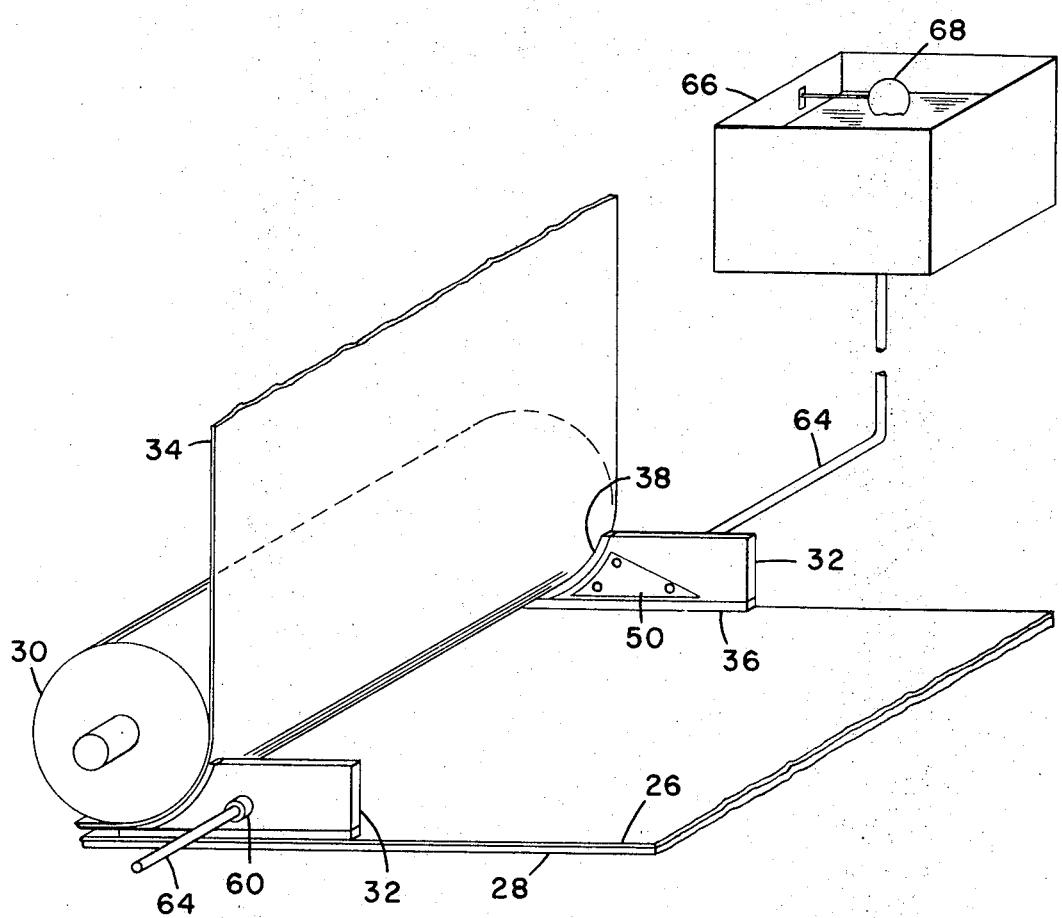
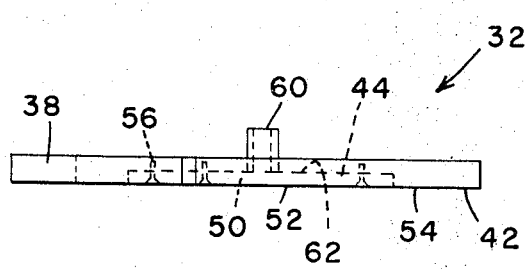
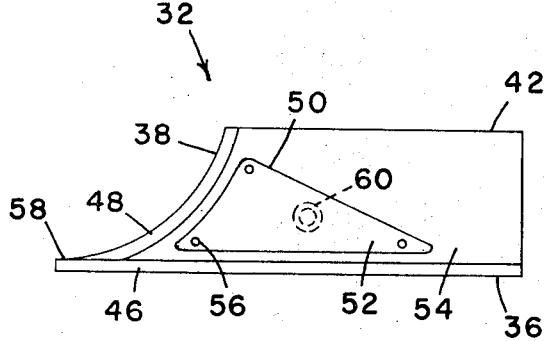

United States Patent Office 3,532,576
Patented Oct. 6, 1970

3,532,576
APPARATUS FOR MAKING GYPSUM BOARD
John B. Proctor, East Aurora, N.Y., and Leo B. Hakes, Phoenix, and Wayne R. Merkley, Mesa, Ariz., assignors to National Gypsum Company, Buffalo, N.Y., a corporation of Delaware
Filed June 20, 1966, Ser. No. 558,970
Int. Cl. B28b 7/38, 4/22
U.S. Cl. 156—348     3 Claims

ABSTRACT OF THE DISCLOSURE

Two pieces of metal laminated together, one of porous metal and one of imporous metal, with a means of supplying water to the interface, provide self-cleaning side walls, hopper points, for containing a continuous supply of gypsum slurry from which gypsum wallboard is formed.

---

This invention relates to an improved method and the related improved apparatus for making gypsum wallboard, and is particularly directed to a self-cleaning containing means adjacent the bank of gypsum slurry immediately ahead of the gypsum wallboard forming roll.

Gypsum wallboard is formed from an aqueous slurry of settable gypsum disposed within and formed into board form between an upper and a lower paper cover sheet. Final forming of the product occurs as the lower paper cover sheet, moving along a conveyor, passes under a relatively large, rotating forming roll. This lower cover sheet continuously delivers with it a supply of the settable gypsum slurry. The upper cover sheet is delivered by the forming roll and meets the gypsum slurry just prior to passing under the forming roll. A slight accumulation or bank of gypsum slurry is allowed to collect on the moving lower paper cover sheet, to provide a continuous, uniform supply of material to be drawn therefrom, between the paper cover sheets as they pass beneath the forming roll.

To prevent this settable gypsum, accumulated in a bank, from flowing to either side and then off the lower cover sheet, a metal sidewall, known as a hopper point, has normally been disposed at each side of the bank. These hopper points are formed with a flat bottom edge to conform with the lower paper cover sheet passing thereunder and an inward arcuate upper edge to conform with the upper paper cover sheet and forming roll passing thereover. The two hopper points, along with the two moving paper cover sheets, thus form essentially a hopper for containing the bank of settable gypsum.

The settable gypsum in the bank is continuously being moved and agitated by the moving paper cover sheets, and as any portion of the settable gypsum slurry contacts one of the paper cover sheets, this portion becomes attached and is drawn by the paper under the forming roll being formed into the core portion of paper-covered gypsum board.

Any portion of the settable gypsum slurry in the bank which happened to contact the hopper points would adhere to the inner surface of the hopper point and an accumulation of gypsum solids would then start to build up, thereat. If left unattended, this accumulation would periodically break off in the form of solid lumps of a rough shape and size, in the order of an inch, which then would mix with the other uniformly mixed portion of the slurry, resulting in forming a non-uniform slurry, passing under the forming roll in clumps, tearing the paper cover sheet or forming undesirable areas of non-uniform core formulation in the gypsum board. Consequently, it has been considered necessary to have a workman continuously in attendance, with a spatula, removing any accumulation that starts on the hopper points before the accumulating progresses to an undesirable degree.

The object of this invention is to overcome the above problem of the accumulation of gypsum on the hopper points. It is thus a further object to avoid the need of continuous attention by a workman, removing accumulations of material from the hopper points.

It is a still further object of the invention to provide a novel self-cleaning containing means for walls of containers of materials, which materials tend to cling to their container walls.

It is a still further object to provide an improved method of handling materials which have the characteristic of adhering to the surfaces of their containing means.

These and other objects of the invention will be more readily apparent when considered in relation to the preferred embodiment as set forth in the specification and shown in the drawings in which:

FIG. 3 is an isometric view of the forming section of the machine of FIG. 1.

FIG. 4 is a top view of one of the hopper points of FIG. 3.

FIG. 5 is a side view of the hopper point of FIG. 4.

Figure 1:
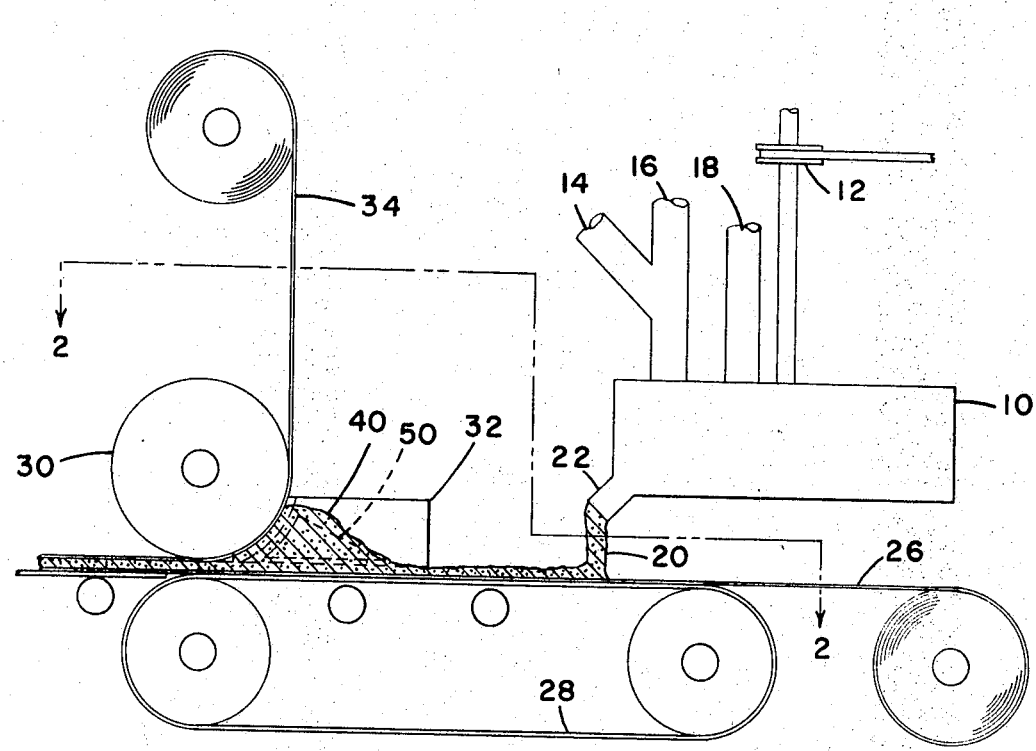
FIG. 1 is a diagrammatic vertical sectional view of the initial part of a gypsum wallboard machine embodying the present invention.
Figure 2:
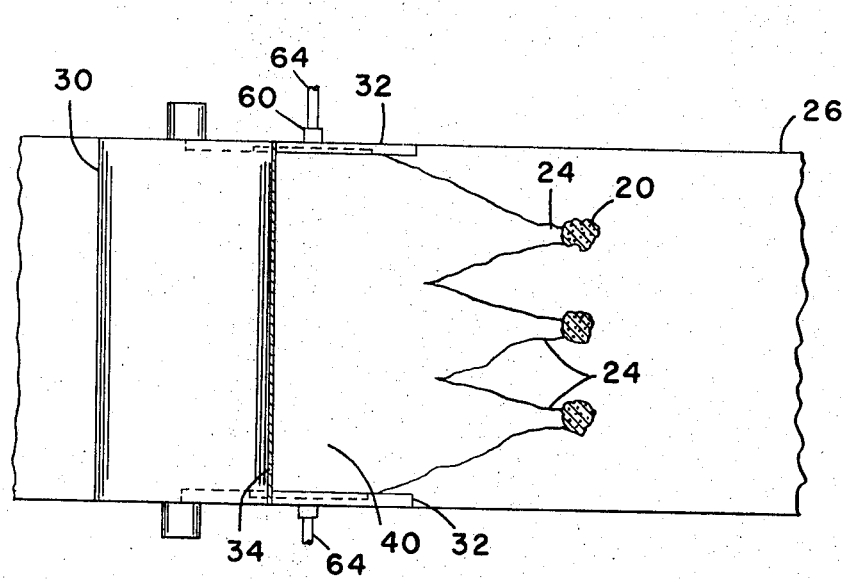
FIG. 2 is a diagrammatic horizontal sectional view of the machine of FIG. 1 taken on line 2—2 of FIG. 1.

Referring to the drawings, FIGS. 1 and 2 show the initial portion of a gypsum wallboard machine, including a rotary mixer 10, with drive means 12, for mixing the ingredients which form the gypsum core of a gypsum wallboard. These ingredients include calcined gypsum which is fed through conduit 14, water, pulp, starch, and other minor additives which are all fed through conduit 16, and foam which is fed through conduit 18. The mixed slurry leaves the mixer 10 in the form of three falling streams 20 from three outlets 22 (one shown).

The three falling streams 20 form three parallel supply streams 24 on a moving lower paper cover sheet 26 which is being advanced thereunder on a conveyor belt 28. The three parallel supply streams 24 are moved toward the forming section of the wallboard machine which includes a forming roll 30 and two hopper points 32, one at each side.

An upper paper cover sheet 34 is fed from above to the forming roll 30, to pass under the forming roll simultaneously and at equal speed with the lower paper cover sheet 26, carrying with them and between them an amount of the mixed slurry of gypsum core material, in accordance with the opening dimension between the forming roll 30 and the conveyor belt 28, forming the predetermined thickness of paper-covered, settable gypsum core wallboard.

At the forming zone, shown in FIG. 3, there is what might be considered a hopper, formed by the advancing lower paper cover sheet 26 forming a flat bottom of the "hopper," the advancing upper paper cover sheet 34 forming a convex quarter cylinder top of the "hopper" by reason of its being supported by the forming roll, and the two hopper points 32, forming the sides of the "hopper." The hopper points have a flat bottom edge 36 conforming to and riding atop the lower paper cover sheet 26, and an inwardly extending arcuate top-front edge 38 conforming to and riding against the upper paper cover sheet 34, with the junction of edges 36 and 38 forming, generally, a point which extends substantially half way under the forming roll 30.

The hopper points 32 are of a height and length sufficient to contain a bank 40 of settable gypsum slurry which is caused to accumulate and remain at a suitable size about as shown in FIGS. 1 and 2, just ahead of the point where the wallboard is formed, under the forming roll.

The description hereabove of the initial portion of a gypsum wallboard machine is applicable to prior machines and is all generally known in the art.

In accordance with the present invention, improved hopper points 32 are included, as will now be described. The hopper points 32 include a main body 42 of half-inch thick stainless steel. A thinner triangular area 44 of the main body 42 is milled-out to a depth of a quarter inch, the triangular area conforming generally to the area to be disposed at the side edges of bank 40 with the exception of a narrow band of full half-inch thick stainless steel along the lower edge and the top-front edge. Also in the preferred form, a replaceable bottom strip 46 of steel and a replaceable top-front strip 48 of steel of about one-quarter inch by one-half inch are screwed to the main body forming, respectively, a replaceable bottom edge 36 and a replaceable top-front edge 38 of hopper points 32.

Disposed within and completely filling the milled-out triangular area 44 of the main body 42 is a one-quarter inch thick porous metal sheet 50, conforming in shape to the shape of the triangular area 44 and presenting an exposed surface 52 flush with the inner face 54 of the stainless steel main body 42. The porous metal sheet 50 is affixed within the main body 42 of the hopper points 32, as by a plurality of small flat head, flush screws 56 extending through the porous metal sheet and into the main body.

At approximately the center of the triangular area 44, or preferably a little further away from the pointed end 58 of the hopper point than the center, there is affixed a small tubular water inlet fitting 60 extending through and threaded into the main body 42, whereby water may be continuously fed therethrough to the back face 62 of the porous metal sheet 50. The back face 62 is of sufficiently rough texture that water fed thereto can flow freely to all areas of the back face 62.

The porous metal may be any of several available compositions, porous bronze and porous stainless steel having been found completely suitable for the purpose. Other metals employed in making porous metal products include Inconel, Monel, Stellite, Hastelloy, nickel, iron-nickel alloys, precious metals and numerous other alloys. Any composition of porous sheet could be used in accordance with the invention as long as it provided sufficient resistance to wear and reaction of any nature with the aqueous gypsum slurry, as well as providing the suitable flow characteristics of water therethrough for the purposes of the invention as discussed further below.

In the preferred form, a porosity of porous metal sheet which would be described as having a pore diameter of about five microns is a suitable porosity in accordance with the present invention. Porous metals are available with pore sizes, which determines porosity, varying from about 0.1 micron to about 200 microns and any porosity could be adapted to the invention with some degree of success. However, pore sizes of about 2 microns and 5 microns have proven completely satisfactory and pore sizes of 0.5 to 50 microns are contemplated as a preferred range in accordance with the invention.

Extending from the outer end of water inlet fitting 60 is a water pipe 64 which conducts water to fitting 60 from a raised, gravity fed, water supply tank 66 which maintains a substantially constant supply and pressure of feed water. Suitable float valve means 68 control the city water supply to the tank 66 to maintain a substantially constant head of water in tank 66. Tank 66 is disposed to provide a 10 foot head of water pressure to the water inlet fitting 60. It will be apparent that lower pressures can be employed with porous metal sheets of greater porosity. However, with excessive porosity, control of the uniformity of flow of the water is substantially lessened.

The water flow through the porous metal sheet 50 is maintained as low as will still just keep the surface 52 wet. This water flows through all portions of the porous metal sheet at a substantially equal rate. The water flows from the back face 62 through to the exposed surface 52, maintaining a constantly weeping surface. The constant addition of water to the exposed surface serves to continuously remove any of the solids of the bank 40 of aqueous calcined gypsum slurry whichever are inclined to become attached to the hopper points 32.

Depending upon the number of attendants that any given gypsum plant may have used to maintain the prior hopper points clean, which could be as many as two full-time attendants, it will be seen that by the present invention, a savings may be provided in gypsum wallboard manufacture of as much as two full-time attendants, a substantial advantage in this very sizable industry.

Having completed a detailed disclosure of the preferred embodiments of our invention so that those skilled in the art may practice the same, we contemplate that variations may be made without departing from the essence of the invention or the scope of the appended claims.

We claim:
1. A gypsum board machine hopper point comprising a thick substantially flat imporous metal main body having a relatively thin portion formed by a cavity in the inner face of said main body, a porous metal sheet disposed within said cavity and substantially conforming to said cavity, and means for supplying a liquid to the interface of said main body and said porous metal sheet, said hopper point having a bottom edge thereof which is straight and a top-front edge thereof which is inwardly arcuate, said bottom edge and said top-front edges forming substantially a point, said porous metal sheet being disposed at least substantially throughout the area located generally between said bottom edge and said top-front edge.

2. A hopper point as defined in claim 1 wherein said porous metal sheet has pores extending therethroughout of a size of about 0.1 micron to 200 microns.

3. A hopper point as defined in claim 1 wherein said porous metal sheet has pores extending therethroughout of a size of about 0.5 to 50 microns.

References Cited

UNITED STATES PATENTS

| | | | |
|---|---|---|---|
| 140,297 | 6/1873 | Murray | 25—18 |
| 1,754,429 | 4/1930 | Knode | 156—39 |
| 2,679,078 | 5/1954 | Clark | 161—113 |

MORRIS SUSSMAN, Primary Examiner

U.S. Cl. X.R.

156—39; 25—18